No. 706,608.  
C. P. STEINMETZ.  
SYSTEM OF ELECTRICAL DISTRIBUTION.  
(Application filed Jan. 2, 1901. Renewed Dec. 26, 1901.)
Patented Aug. 12, 1902.
(No Model.)
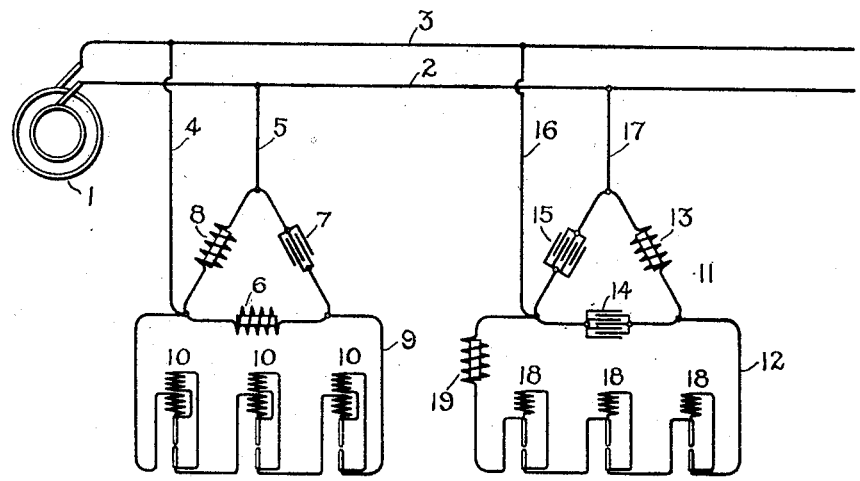
Witnesses  
John Ellis Glenn  
Benjamin B. Hull.
Inventor:  
Charles P. Steinmetz,  
by Albert G. Davis  
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 706,608, dated August 12, 1902.

Application filed January 2, 1901. Renewed December 26, 1901. Serial No. 87,323. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 1,613,) of which the following is a specification.

My present invention relates to certain improvements in transforming devices of that class in which combinations of reactance devices of opposite signs—such, for example, as inductance-coils and condensers—are used for changing alternating current at constant potential into alternating current of constant volume, or the reverse. It has heretofore been proposed to accomplish this result by connecting an inductance-coil and a condenser in series across the constant-potential mains, the constant-current circuit which coöperates therewith being connected in shunt to one or the other of these reactance devices. This arrangement has the objection that when in operation it causes a wattless current to flow in the constant-potential mains. In accordance with my invention I provide means for compensating for this wattless current, thereby bringing the power factor of the constant-potential circuit back to unity or at least back to the value of the power factor in the constant-current circuit. This, as well as certain other features of my invention, will better be understood by reference to the following detailed description of the same, taken in connection with the accompanying drawing, in which I show two arrangements of transforming devices embodying the features of my invention.

At 1 I have indicated conventionally a source of alternating current which is conveyed by suitable distributing-conductors 2 and 3 to any desired translating devices. Leads 4 5 convey current from the source, which in this case is of constant potential, to a triangular arrangement of reactances which constitutes means for transforming this constant-potential current into current of constant volume. This arrangement of reactances consists of an inductance-coil 6 and a condenser 7 of equal reactance connected in series with each other across the leads 4 5. An additional inductance-coil 8 is connected directly across these leads. A constant-current consumption-circuit 9, including arc-lamps 10 of the differential type, is connected across the terminals of the inductance-coil 6.

Current traversing the condenser 7 and the inductance-coil 6 gives rise to an electromotive force across the terminals of the inductance-coil 6, which electromotive force is in quadrature with that across the leads 4 5 and varies in such a manner as to maintain a constant current in the circuit 9. The condenser 7 being traversed by current flowing between the constant-potential circuit and the constant-current circuit, gives rise to a wattless leading current in the constant-potential circuit. This is objectionable, since it reduces the power factor of the system. The inductance-coil 8, connected in shunt to the constant-potential system, draws therefrom a wattless lagging current, which compensates for the leading current demanded by the condenser 7, thereby bringing the power factor of the system back to its normal value.

In order to obtain a constant current in the circuit 9, it is necessary that the inductance-coil 6 and the condenser 7 bear a certain fixed relation to each other, this relation being such as to make the reactance of each equal to that of the other. As these reactances depend upon the frequency of the alternating current it is necessary that account should be taken of this fact in proportioning the same, as will be readily understood by one skilled in the art.

The second set of transforming apparatus (indicated generally at 11) is the same in principle as the first set, but differs therefrom in that the constant-current circuit 12 instead of being shunted about an inductance-coil 13 is, on the other hand, shunted about the condenser 14. The additional condenser 15, shunted across the leads 16 and 17, which supply current to the apparatus, supplies leading current to compensate for the lagging current taken by the inductance-coil 13, through which current passes from the constant-potential mains to the constant-current circuit 12. This constant-current circuit 12 is shown as provided with translating devices consisting of arc-lamps 18 of the so-called "shunt" type, in which the regulating magnet or magnets are connected in shunt to the arc. Unlike the differential arc-lamps shown at 10 in connection with the first transforming set the shunt-lamps are unstable in operation in a circuit of the character described unless provided with some adjunctive device for securing stability of operation. These shunt-lamps when the carbons are together possess scarcely any inductance, while when the carbons are drawn apart the shunt-magnets are included in circuit, thereby largely increasing the inductance of the lamp. Any movement therefore of the carbons varies the inductance in the constant-current circuit, and the transforming apparatus in its efforts to maintain constancy of current causes the regulating mechanism to alternately raise and lower the carbons of the lamp, which thus becomes unstable in operation. To insure stability, I connect in series in the constant-current circuit an inductance-coil 19, having a stable resistance. The tendency to fluctuate of current due to pumping of the lamps is by the presence of this inductance-coil strongly suppressed, thereby securing stability of operation of the lamps.

Wherever herein I speak of "reactances of opposite sign," I mean to include devices which possess capacity and inductance, respectively. For the purpose of illustration I have shown a condenser as typifying a device possessing capacity and an inductance-coil as typifying a device possessing inductance; but it will be evident to those skilled in the art that other devices possessing these same qualities may be employed—such, for example, as polarization-cells, transformers with open magnetic circuits, transformers with condensers in their secondaries, &c.

What I claim as new, and desire to secure by Letters Patent of the United States, is—

1. The combination of constant-potential mains, reactances of opposite sign connected in series across said mains, a consumption-circuit operatively connected across one of said reactances, and an additional reactance operatively connected in shunt to said mains.

2. The combination of constant-potential mains, reactances of opposite sign connected in series across said mains, a consumption-circuit connected across one of said reactances of given sign, and a reactance of opposite sign connected in shunt to said mains.

3. The combination of supply-mains, reactances of opposite sign in series across said mains, a constant-current circuit in shunt to one of said reactances, and an additional reactance in shunt to said mains.

4. The combination of constant-potential mains, reactances of opposite sign in series across said mains, a constant-current circuit in shunt to one of said reactances, and an additional reactance in shunt to said mains.

5. The combination of a constant-potential circuit, a constant-current circuit, means for transferring energy between the two circuits, arc-lamps of the shunt type in series in the constant-current circuit, and an inductance device in series with said lamps.

6. The combination of a closed circuit including in series three reactances two of which are of the same sign and the remaining one of opposite sign, a constant-potential circuit shunted about one of said reactances, and a constant-current circuit in shunt to another of said reactances.

7. The combination of a closed circuit including in series three reactances two of which are of different sign from the third, a constant-potential circuit connected in shunt to one of the two reactances of the same sign, and a constant-current circuit in shunt to the other of said two reactances of the same sign.

8. The combination of constant-potential mains, a condenser and an inductance device connected in series across said mains, a consumption-circuit operatively connected across said condenser, and an inductance device connected across said mains.

9. The combination of constant-potential mains, a condenser and an inductance device connected in series across said mains, a consumption-circuit operatively connected across said condenser, an inductance device in series in said consumption-circuit, and an inductance device connected across said mains.

10. The combination of a constant-potential circuit, reactances of opposite sign in series across said circuit, a consumption-circuit connected across one of said reactances and including arc-lamps of the shunt type in series, and an inductance device in series in said consumption-circuit.

11. The combination of a constant-potential circuit, reactances of opposite sign in series across said circuit, a consumption-circuit connected across one of said reactances and including arc-lamps of the shunt type, and an inductance device in series in said consumption-circuit.

In witness whereof I have hereunto set my hand this 29th day of December, 1900.

CHARLES P. STEINMETZ.

Witnesses:
BENJAMIN B. HULL,
EDWARD WILLIAMS, Jr.